(12) United States Patent  
Fukawatase et al.

(10) Patent No.: US 7,862,079 B2  
(45) Date of Patent: Jan. 4, 2011

(54) STEERING COLUMN DEVICE WITH KNEE AIRBAG DEVICE

(75) Inventors: Osamu Fukawatase, Nishikamo-gun (JP); Kenji Imamura, Kosai (JP); Akiyoshi Sanada, Nishikamo-gun (JP); Yuichi Adachi, Nishikasugai (JP); Kazuaki Bito, Nishikasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 300 days.

(21) Appl. No.: 12/071,701

(22) Filed: Feb. 25, 2008

(65) Prior Publication Data

US 2008/0217890 A1 Sep. 11, 2008

(30) Foreign Application Priority Data

Mar. 9, 2007 (JP) .............................. 2007-060202

(51) Int. Cl.
*B60R 21/203* (2006.01)
*B62D 1/11* (2006.01)

(52) U.S. Cl. ...................................... 280/731; 280/777
(58) Field of Classification Search ................. 280/731, 280/728.3, 728.2, 775, 776, 777, 779, 730.1
See application file for complete search history.

(56) References Cited

U.S. PATENT DOCUMENTS

| 5,507,521 A * | 4/1996 | Steffens, Jr. ................. 280/775 |
| 5,570,901 A * | 11/1996 | Fyrainer ................... 280/730.1 |
| 6,227,571 B1 * | 5/2001 | Sheng et al. ................. 280/777 |
| 7,182,365 B2 * | 2/2007 | Takimoto et al. ......... 280/730.1 |
| 7,600,776 B2 * | 10/2009 | Hoshino et al. .......... 280/730.1 |
| 2008/0217888 A1 * | 9/2008 | Fukawatase et al. ..... 280/730.1 |
| 2008/0217890 A1 * | 9/2008 | Fukawatase et al. ........ 280/731 |

FOREIGN PATENT DOCUMENTS

| JP | A 8-301054 | 11/1996 |
| JP | A 9-104317 | 4/1997 |
| JP | A 9-123862 | 5/1997 |
| JP | A 10-71911 | 3/1998 |
| JP | A 2001-106013 | 4/2001 |
| JP | A 2002-37003 | 2/2002 |
| JP | A-2004-122856 | 4/2004 |
| JP | A 2004-345561 | 12/2004 |
| JP | A-2006-306340 | 11/2006 |

\* cited by examiner

*Primary Examiner*—Paul N Dickson  
*Assistant Examiner*—Karen A Beck  
(74) *Attorney, Agent, or Firm*—Oliff & Berridge PLC

(57) ABSTRACT

A steering column device with a knee airbag device includes a steering column provided with a telescopic mechanism; a column cover that covers the rear end portion of the steering column; an airbag module, provided inside the column cover, which includes a gas generation device that generates gas, and a knee airbag that is inflated and deployed by the gas; an airbag door that is provided in the column cover, and that is opened when the airbag door receives the inflation pressure of the knee airbag; a collision prediction device that predicts that a vehicle will have a collision with a collision object; and a control device that operates the telescopic mechanism so that each of the column cover and the airbag module is moved rearward to a predetermined position, when the collision prediction device predicts that the vehicle will have a collision with the collision object.

9 Claims, 3 Drawing Sheets

STEERING COLUMN DEVICE WITH KNEE AIRBAG DEVICE

INCORPORATION BY REFERENCE

The disclosure of Japanese Patent Application No. 2007-060202 filed on Mar. 9, 2007 including the specification, drawings and abstract is incorporated herein by reference in its entirety.

BACKGROUND OF THE INVENTION

1. Field of the Invention

The invention relates to a steering column device with a knee airbag device that includes a knee airbag that is inflated and deployed to restrain knees of an occupant when a collision occurs, and when it is predicted that a collision will occur.

2. Description of the Related Art

Various knee airbag devices have been proposed to protect the knees of an occupant. For example, each of Japanese Patent Application Publication No. 9-104317 (JP-A-9-104317) and Japanese Patent Application Publication No. 9-123862 (JP-A-9-123862) describes a knee airbag device that includes an airbag module disposed inside a column cover for a steering column.

However, in the above-described technology, in the case where the airbag module overlaps the outline of an instrument panel in a lateral view when the knee airbag device is provided in a vehicle, it is not possible to form an airbag door that extends in the lower surface and side surfaces of the column cover so that the airbag door is widely opened. Also, in the case where the outline of the instrument panel is greatly curved toward a console box in a plan view so that the occupant easily gets in and out of the vehicle, and the airbag module overlaps the outline of the instrument panel in the plan view when the knee airbag device is provided in the vehicle, the outline of the instrument panel in an inner area of the vehicle overlaps the airbag module by a large amount. Therefore, it is more difficult to widely open the airbag door. Further, the same problem occurs also in the case where a steering wheel is placed at a front position in the direction of the axis of a steering column in the steering column device provided with a telescopic mechanism.

SUMMARY OF THE INVENTION

The invention provides a steering column device with a knee airbag device in which an airbag door is widely opened in the case where the design of an instrument panel imposes restrictions on opening movement of the airbag door, or in the case where a steering wheel is placed at a front position in the direction of the axis of a steering column by a telescopic mechanism.

A first aspect of the invention relates to a steering column device with a knee airbag device, which includes: a steering column provided with a telescopic mechanism; a column cover that covers the rear end portion of the steering column; an airbag module that is provided inside the column cover, and that includes a gas generation device that is operated to generate gas when a collision occurs, and a knee airbag that is inflated and deployed from a folded state by the gas generated by the gas generation device; an airbag door that is provided in the column cover, and that is opened when the airbag door receives the inflation pressure of the knee airbag; a collision prediction device that predicts that a vehicle will have a collision with a collision object; and a control device that operates the telescopic mechanism so that each of the column cover and the airbag module is moved rearward to a predetermined position, when the collision prediction device predicts that the vehicle will have a collision with the collision object.

In the first aspect, the predetermined position may be a rearmost position in each of a range where the column cover can be moved using the telescopic mechanism, and a range where the airbag module can be moved using the telescopic mechanism.

According to the above-described aspect of the invention, when the collision prediction device predicts that a vehicle will have a collision with a collision object, the control device operates the telescopic mechanism. Thus, the column cover that covers the rear end portion of the steering column, and the airbag module disposed inside the column cover are moved rearward to the fullest extent. Accordingly, the airbag door is opened without interfering with the instrument panel at all, or almost at all, in the case where the airbag module crosses the outline of the instrument panel due to the design of the instrument panel, or in the case where the position of the steering wheel is adjusted to a front position in the direction of the axis of the steering column by the telescopic mechanism.

As described above, in the steering column device with the knee airbag device, it is possible to obtain the advantageous effect that the airbag door is widely opened, in the case where the design of the instrument panel imposes restrictions on the opening movement of the airbag door, or in the case where the steering wheel is placed at a front position in the direction of the axis of the steering column by the telescopic mechanism.

In the first aspect, the telescopic mechanism may be an electric telescopic mechanism that is driven by a telescopic motor.

According to the above-described aspect, because the telescopic mechanism is an electric telescopic mechanism that is driven by the telescopic motor, it is possible to relatively easily execute the control that operates the telescopic mechanism when the collision prediction device predicts that the vehicle will have a collision with the collision object.

In the steering column device with the knee airbag device, the control device controls the operation of the telescopic motor, thereby widely opening the airbag door, in the case where the design of the instrument panel imposes restrictions on the opening movement of the airbag door, or in the case where the steering wheel is placed at a front position in the direction of the axis of the steering column at normal times. Therefore, it is possible to obtain the advantageous effect that the length of the steering column is quickly increased (that is, the area where the airbag door is opened is quickly moved rearward) by controlling a small number of components.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
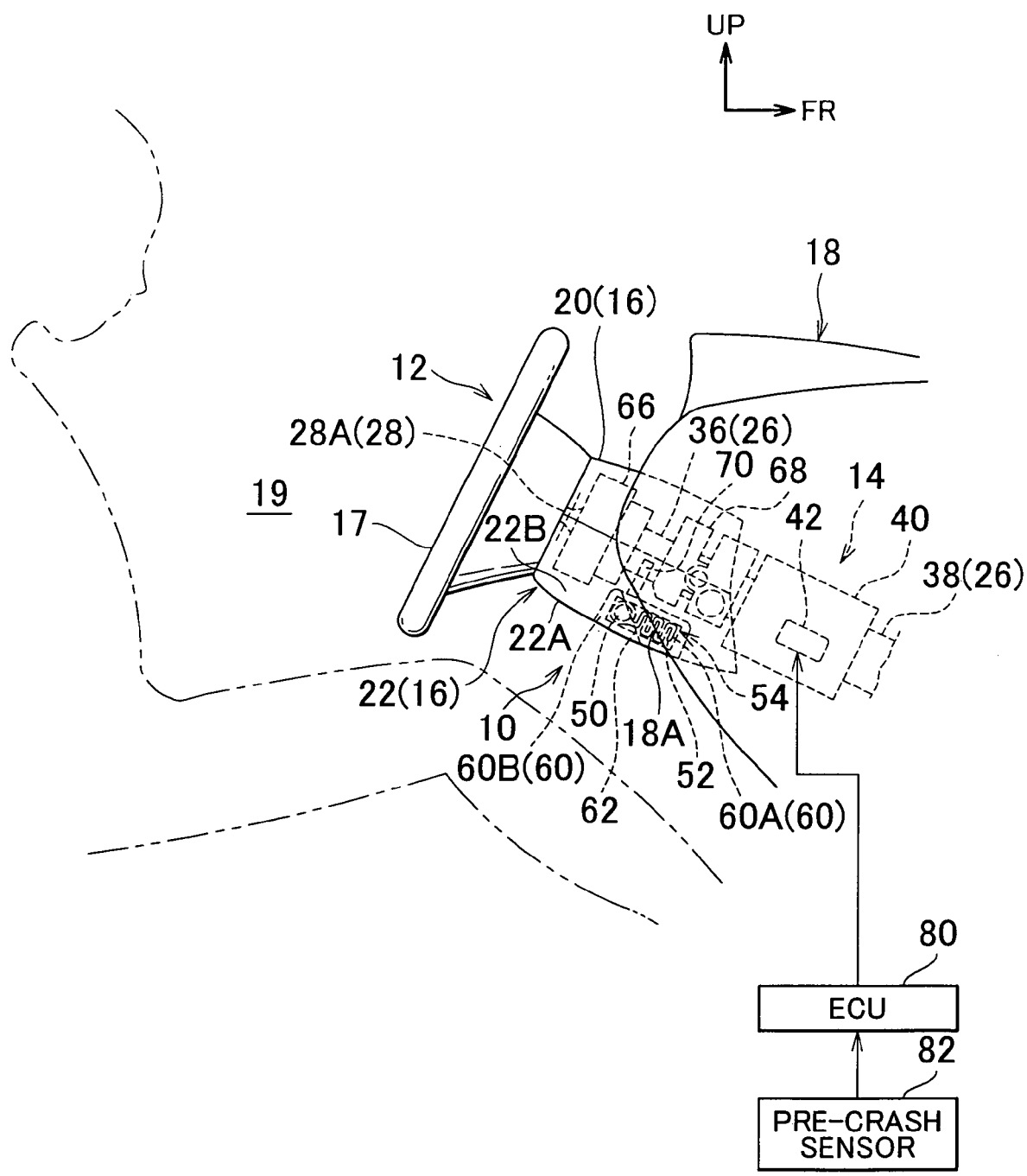
FIG. 1 is a lateral view showing the entire configuration of a steering column device with a knee airbag device according to an embodiment of the invention.
Figure 2:
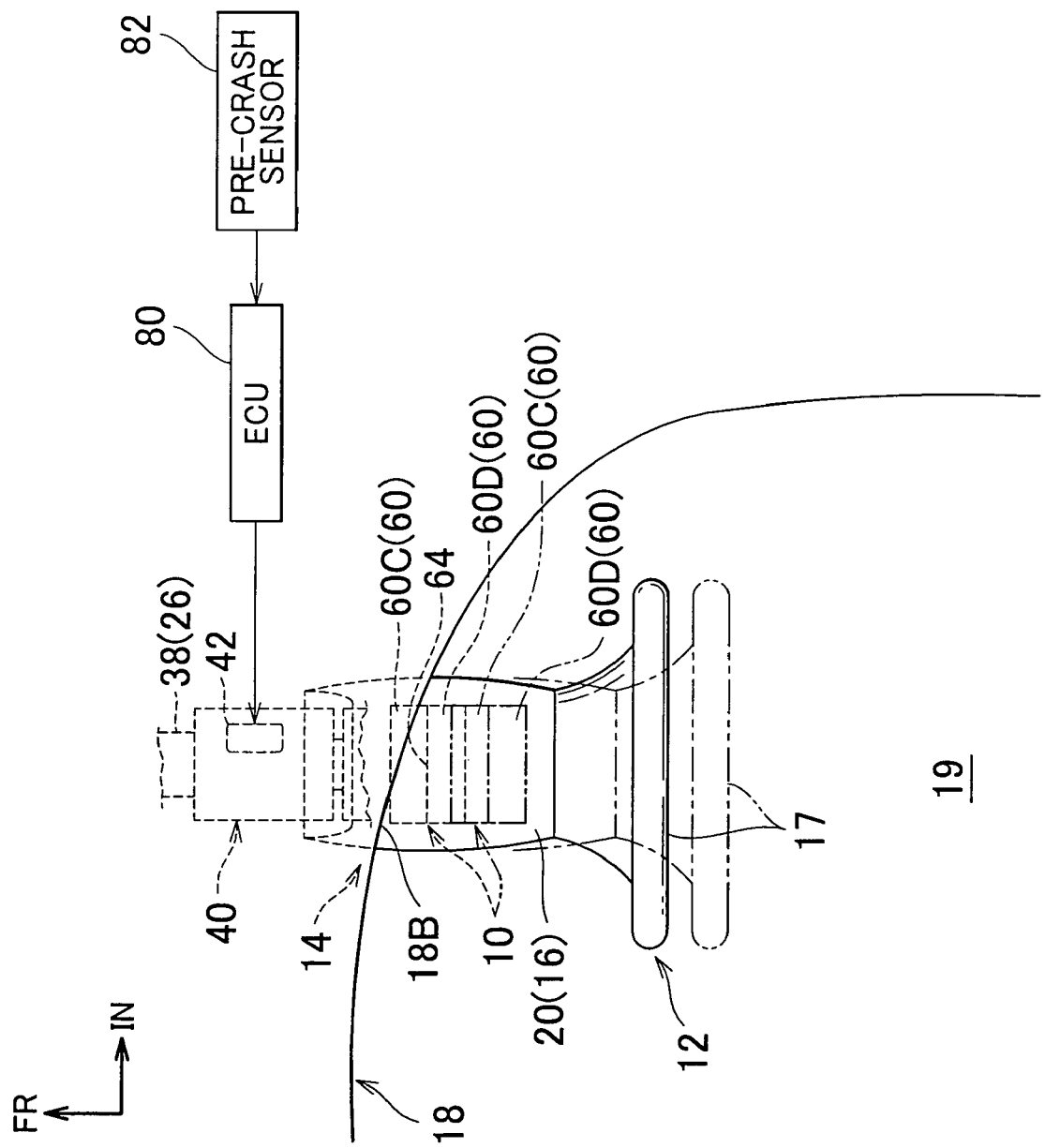
FIG. 2 is a plan view showing the steering column device with the knee airbag device shown in FIG. 1.
Figure 3:
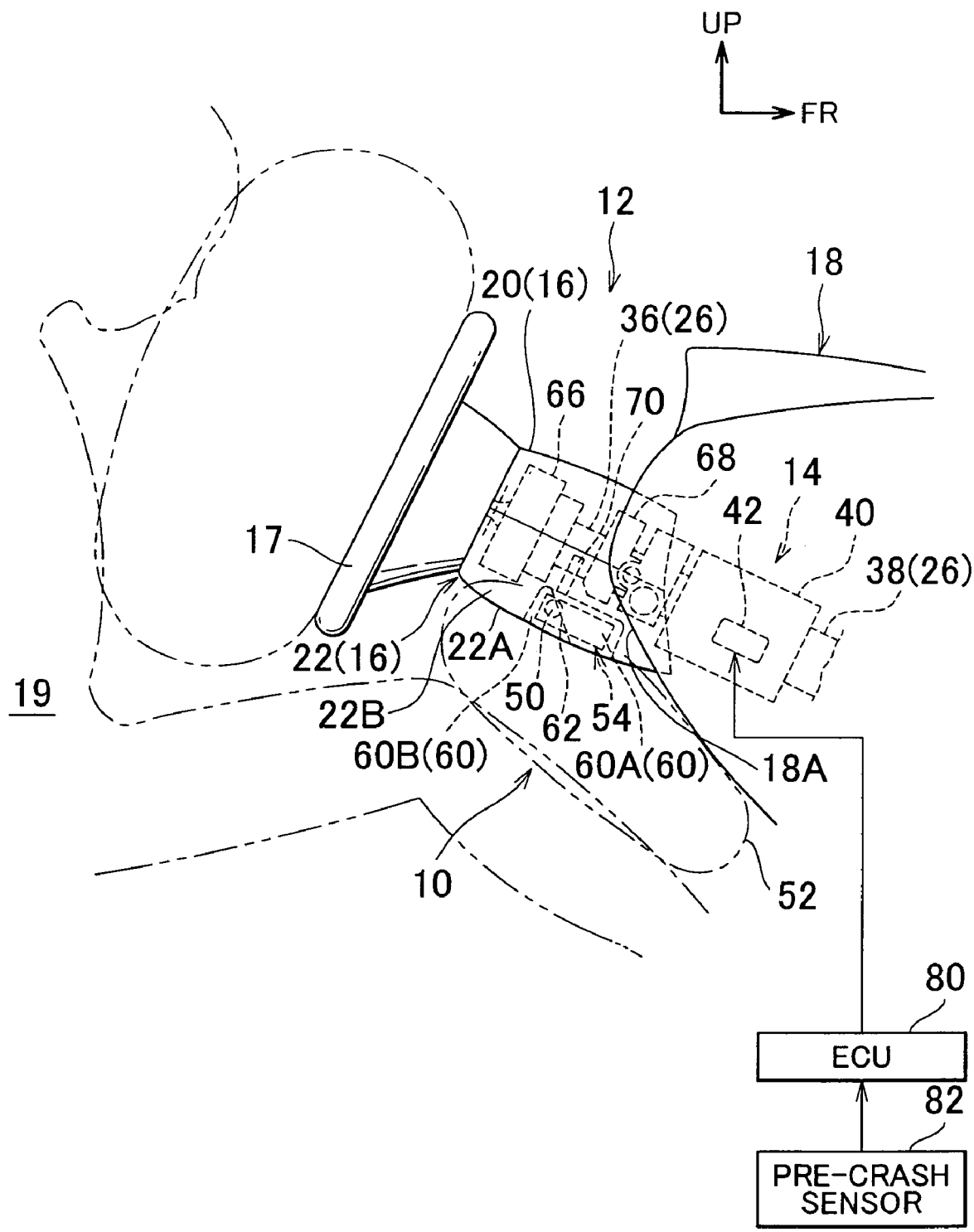
FIG. 3 is a lateral view showing the steering column device with the knee airbag device shown in FIG. 1, which is operated.

Hereinafter, a steering column device with a knee airbag device according to an embodiment of the invention will be described with reference to FIG. 1 to FIG. 3. In FIG. 1 to FIG. 3, the arrow FR indicates the front of a vehicle. The arrow UP indicates the top of the vehicle. The arrow IN indicates the inside of the vehicle in a vehicle-width direction.

FIG. 1 is a lateral view showing the entire configuration of a steering column device 12 with a knee airbag device 10 according to the embodiment of the invention. FIG. 2 is a plan view showing the steering column device 12 with the knee airbag device 10. Further, FIG. 3 is a lateral view showing the steering column device 12 with the knee airbag device 10, which is operated. In the embodiment, the steering column device 12 with the knee airbag device 10 is installed in a left-hand drive vehicle.

As shown in FIG. 1 and FIG. 2, the steering column device 12 includes a steering column body 14, a column cover 16 that covers the rear end portion of the steering column body 14, and a steering wheel 17 that is disposed in the rear end portion of the steering column body 14. In the steering column device 12, the steering column body 14 is inserted through an opening portion (not shown) formed in a portion of an instrument panel 18, which faces a driver seat. The steering column body 14 is inclined downward toward the front of the vehicle. The steering column body 14 is supported by an instrument panel reinforcement (not shown) using a steering support. Thus, the steering column body 14 is attached to a vehicle body. The instrument panel reinforcement with high strength and high stiffness extends in the vehicle-width direction in the instrument panel 18 to connect right and left front pillars. Thus, the steering column body 14 is attached to a vehicle body.

When the steering column device 12 is installed, the front end portion of the column cover 16 is disposed in the instrument panel 18. The other portion of the column cover 16 protrudes into a cabin 19. The column cover 16 is divided into two portions, i.e., an upper portion and a lower portion. More specifically, the column cover 16 includes a column upper cover 20 and a column lower cover 22.

[General structure of the steering column body 14] The steering column body 14 includes a cylindrical column tube 26. A steering main shaft 28 is rotatably supported in the core portion of the column tube 26. The steering main shaft 28 is divided into two portions in the direction of the axis of the steering column body 14. More specifically, the steering main shaft 28 includes an upper shaft 28A and a lower shaft (not shown) that are connected to each other through spline fitting. Accordingly, the upper shaft 28A is movable with respect to the lower shaft in the axial direction thereof in a range of a predetermined stroke. However, the upper shaft 28A is not rotatable with respect to the lower shaft. The steering wheel 17 is fixed to the rear end portion of the upper shaft 18A using a nut. A steering force is applied to the steering wheel 17 from a driver.

The column tube 26 that covers the steering main shaft 28 is also divided into two portions in the direction of the axis of the steering column body 14 (that is, the column tube 26 has a double-pipe structure). More specifically, the column tube 26 includes an inner tube 36 disposed close to an occupant, and an outer tube 38 disposed far from the occupant (i.e., close to a steering gear box). The inner tube 36 and the outer tube 38 are connected to each other through spline fitting. The outer tube 38 has a larger diameter than the diameter of the inner tube 36. When a secondary collision occurs between the occupant and the steering wheel 17, the inner tube 36 slides into the outer tube 38 so that the column tube 26 is contracted. Thus, energy is absorbed when the secondary collision occurs. Further, the outer tube 38 is supported by the steering support using a bracket. The steering support is fixed to the instrument panel reinforcement (not shown) that has a pipe shape. The instrument panel reinforcement with high strength and high stiffness extends in the vehicle-width direction in the instrument panel 18, as described above.

The steering column device 12 with the knee airbag device 10 is electrically operated. A tilt/telescopic drive mechanism portion 40 is disposed in the outer tube 38 of the steering column body 14 at a predetermined position. The tilt mechanism moves the steering wheel 17 upward and downward in a direction perpendicular to the axis of the steering column body 14, by pivoting the steering column body 14 around a supporting point. Thus, the tilt mechanism adjusts the position of the steering wheel 17 in a vehicle-height direction (i.e., the height of the steering wheel 17). The telescopic mechanism moves the steering wheel 17 in the direction of the axis of the steering column body 14 by contracting the steering column body 14. Thus, the telescopic mechanism adjusts the position of the steering wheel 17 in the vehicle-longitudinal direction. In FIG. 1 and FIG. 2, a drive motor that drives the telescopic mechanism (hereinafter, referred to as "telescopic motor") is denoted by reference numeral "42". A drive motor for the tilt mechanism is separately provided.

[Configuration of the knee airbag device 10] The knee airbag device 10 is provided below the rear end portion of the steering column body 14. When a frontal collision occurs, and when it is predicted that a frontal collision will occur, the knee airbag device 10 is operated. The position where the knee airbag device 10 is disposed will be supplementarily described. A combination switch 66 is disposed on the rear end portion of the inner tube 36 of the steering column body 14. Further, an electric steering lock 68 is disposed on the inner tube 36 at a position ahead of the combination switch 66 in the direction of the axis of the steering column body 14. The knee airbag device 10 is attached to the inner tube 36 using an attachment bracket 70. The attachment bracket 70 is fixed to the inner tube 36 at a position close to the steering lock 68 by welding or the like.

The knee airbag device 10 includes an airbag module 54 disposed in the column lower cover 22, and an airbag door 60 formed in the lower surface 22A and the side surfaces 22B of the column lower cover 22.

The airbag module 54 includes an inflator 50 that is operated to generate gas, and a knee airbag 52 that is inflated and deployed by the gas generated by the inflator 50. The inflator 50 is disposed in the rear portion of the airbag module 54 (i.e., the portion of the airbag module 54 that is close to the steering wheel 17). A stud bolt (not shown) stands on the inflator 50 toward the inner tube 36. Because the stud bolt is fixed to the attachment bracket 70 using a nut, the airbag module 54 is supported by the inner tube 36. The knee airbag 52 is disposed in a folded state in the front portion of the airbag module 54. The knee airbag 52 is accordion-folded, and/or rolled up.

A predetermined tear line 62 (refer to FIG. 1) and a predetermined tear line 64 (refer to FIG. 2) are formed in the inner portion of the column lower cover 22. Thus, when the inflation pressure of the knee airbag 52 is equal to or higher than a predetermined value, the tear lines 62 and 64 are torn. As a result, the airbag door 60 is opened. FIG. 1 shows a side front door 60A and a side rear door 60B of the airbag door 60, which are formed in each of the side surfaces 22B of the column lower cover 22. FIG. 2 shows a lower front door 60C and a lower rear door 60D that are formed in the lower surface of the column lower cover 22. The airbag door 60 may be formed integrally with the column lower cover 22 as described above. However, an opening, through which the knee airbag 52 expands, may be formed in the lower surface of the column lower cover 22, and an airbag door, which is formed separately from the column lower cover 22, may cover the opening. Further, although the airbag door 60 is divided into six portions in the embodiment, the airbag door may be divided into four portions. In this case, each side door is not divided into a side front door and a side rear door. Alternatively, the airbag door may be divided in the other manners.

As shown in FIG. 1, in the above-described steering column device 12, the side rear door 60B of the airbag door 60 does not interfere with the outline (design line) 18A of the instrument panel 18, and the side front door 60A interferes with the outline 18A in a lateral view, at normal times, i.e., when the steering column device 12 is not telescopically operated (that is, when the steering column device 12 is in a normal position). In the lateral view, the outline 18A of the instrument panel 18 extends in a C-shape that projects toward the steering wheel 17.

As shown by the solid line in FIG. 2, the lower rear door 60D does not interfere with the outline (design line) 18B of the instrument panel 18, and the lower front door 60C interferes with the outline 18B in a plan view, at normal times, i.e., when the steering column 12 is not telescopically operated (that is, when the steering column device 12 is in the normal position). In the plan view, the outline 18B of the instrument panel 18 is smoothly curved toward a console box so that the occupant easily gets in and out of the vehicle. The outline 18B of the instrument panel 18 is an outline of the instrument panel 18 at the position of the lower front door 60C and the lower rear door 60D in the vehicle-height direction. In FIG. 2, the airbag door 60 is shown in the column upper cover 20 to clearly show the positional relation between the outline 18B of the instrument panel 18 and the airbag door 60. However, as described above, the airbag door 60 is provided in the column lower cover 22.

Further, as shown in FIG. 1 and FIG. 2, the above-described telescopic motor 42 is connected to an ECU 80 that functions as control device. Thus, the ECU 80 controls the operation of the telescopic motor 42. The ECU 80 is also connected to a pre-crash sensor 82 that functions as collision prediction device. The pre-crash sensor 82 is disposed near the center portion of a front bumper (not shown).

[Advantageous effects in the embodiment] Next, advantageous effects obtained in the embodiment will be described.

When a vehicle normally travels, the steering wheel 17 is placed at a position appropriate for the body size of the occupant in the vehicle-longitudinal direction and the vehicle-height direction, by operating the tilt/telescopic drive mechanism portion 40. Accordingly, in this case, the side front door 60A of the airbag door 60 interferes with (crosses) the outline 18A of the instrument panel 18 in the lateral view, and the lower front door 60C of the airbag door 60 interferes with (crosses) the outline 18B of the instrument panel 18 in the plan view.

In this situation, when it is predicted that a frontal collision will occur, that is, when the pre-crash sensor 82 predicts that the vehicle will have a frontal collision with a collision object, a detection signal is transmitted from the pre-crash sensor 82 to the ECU 80. When the ECU 80 determines that the vehicle will have a frontal collision with the collision object, the ECU 80 outputs a predetermined drive signal to the telescopic motor 42 in the tilt/telescopic drive mechanism portion 40. Thus, the telescopic motor 42 is driven so that the direction of the rotation of the telescopic motor 42 is reversed, and the steering wheel 17 and the inner tube 36 are moved toward the occupant to the fullest extent, as shown in FIG. 3, and as shown by the two-dot chain lines in FIG. 2. As a result, the side front door 60A of the airbag door 60 is moved rearward to the position where the side front door 60A does not interfere with (does not cross) the outline 18A of the instrument panel 18 in the lateral view. In addition, the lower front door 60C of the airbag door 60 is moved rearward to the position where the lower front door 60C does not interfere with (does not cross) the outline 18B of the instrument panel 18 in the plan view.

As a result, according to the embodiment, the airbag door 60 is widely opened, in the case where the design of the instrument panel 18 imposes restrictions on the opening movement of the airbag door 60, or in the case where the steering wheel 17 is placed in a front position in the direction of the axis of the steering column device 14 by the tilt/telescopic drive mechanism portion 40.

Also, in the embodiment, the tilt/telescopic drive mechanism portion 40 is an electric mechanism portion that is driven by the telescopic motor 42. Therefore, it is possible to relatively easily execute the control that operates the tilt/telescopic drive mechanism portion 40 when it is predicted that the vehicle will have a collision with a collision object. That is, the hardware does not need to be changed, and only the software needs to be changed to suppress or prevent the interference between the airbag door 60 and the instrument panel 18. As a result, according to the embodiment, the ECU 80 controls the operation of the telescopic motor 42, thereby widely opening the airbag door 60, in the case where the design of the instrument panel 18 imposes restrictions on the opening movement of the airbag door 60, or in the case where the steering wheel 17 is placed in a front position in the direction of the axis of the steering column device 14. Thus, the length of the steering column body 14 is quickly increased (that is, the area where the airbag door 60 is opened is quickly moved rearward) by controlling a small number of components.

In the embodiment, when it is predicted that the vehicle will have a frontal collision with a collision object, each of the steering wheel 17 and the inner tube 36 is moved toward the occupant to the fullest extent, that is, moved to the rearmost position. However, each of the steering wheel 17 and the inner tube 36 does not necessarily need to be moved to the rearmost position. That is, each of the steering wheel 17 and the inner tube 36 may be moved rearward to any position where the side front door 60A of the airbag door 60 does not interfere with (does not cross) the outer line 18A of the instrument panel 18 in the lateral view. Alternatively, each of the steering wheel 17 and the inner tube 36 may be moved rearward to any position where the lower front door 60C does not interfere with (does not cross) the outline 18B of the instrument panel 18 in the plan view.

What is claimed is:

1. A steering column device with a knee airbag device, comprising:
a steering column provided with a telescopic mechanism;
a column cover that covers a rear end portion of the steering column;
an airbag module that is provided inside the column cover, and that includes a gas generation device that is operated to generate gas, and a knee airbag that is inflated and deployed from a folded state by the gas generated by the gas generation device;
an airbag door that is provided in the column cover, and that is opened when the airbag door receives an inflation pressure of the knee airbag;

a collision prediction device that predicts that a vehicle will have a collision with a collision object; and a control device that operates the telescopic mechanism so that each of the column cover and the airbag module is moved rearward to a predetermined position, when the collision prediction device predicts that the vehicle will have the collision with the collision object, wherein the airbag door includes a side door that is formed in each of side surfaces of the column cover; and when the column cover and the airbag module are moved rearward to the predetermined position, the side door does not substantially interfere with an outline of an instrument panel in a lateral view.

2. The steering column device with the knee airbag device according to claim 1, wherein the telescopic mechanism is an electric telescopic mechanism that is driven by a telescopic motor.

3. The steering column device with the knee airbag device according to claim 1, wherein:

the predetermined position is a rearmost position in each of a range where the column cover can be moved using the telescopic mechanism, and a range where the airbag module can be moved using the telescopic mechanism.

4. A steering column device with a knee airbag device, comprising:

a steering column provided with a telescopic mechanism;

a column cover that covers a rear end portion of the steering column;

an airbag module that is provided inside the column cover, and that includes a gas generation device that is operated to generate gas, and a knee airbag that is inflated and deployed from a folded state by the gas generated by the gas generating device;

an airbag door that is provided in the column cover, and that is opened when the airbag door receives an inflation pressure of the knee airbag;

a collision prediction device that predicts that a vehicle will have a collision with a collision object; and a control device that operates the telescopic mechanism so that each of the column cover and the airbag module is moved rearward to a predetermined position, when the collision prediction device predicts that the vehicle will have the collision with the collision object, wherein the airbag door includes a lower door that is formed in a lower surface of the column cover; and when the column cover and the airbag module are moved rearward to the predetermined position, the lower door does not substantially interfere with an outline of an instrument panel in a plan view.

5. The steering column device with the knee airbag device according to claim 4, wherein the outline of the instrument panel is an outline of the instrument panel at the position of the lower door in the vehicle height direction.

6. The steering column device with the knee airbag device according to claim 4, wherein the predetermined position is a rearmost position in each of a range where the column cover can be moved using the telescopic mechanism, and a range where the airbag module can be moved using the telescopic mechanism.

7. The steering column device with the knee airbag device according to claim 1, wherein the side door includes a side front door and a side rear door, when the steering column is in a normal position in which the telescopic mechanism is not operated, the side front door of the airbag door interferes with the outline of the instrument panel in the lateral view, and when each of the column cover and the airbag door is moved to the predetermined position by the control device, the side front door of the airbag module does not interfere with the outline of the instrument panel at all, or almost at all in the lateral view so that the airbag door is widely opened.

8. The steering column device with the knee airbag device according to claim 4, wherein the lower door includes a lower front door and a lower rear door, when the steering column is in a normal position in which the telescopic mechanism is not operated, the lower front door of the airbag door interferes with the outline of the instrument panel in the plan view, and when each of the column cover and the airbag door is moved to the predetermined position by the control device, the lower front door of the airbag module does not interfere with the outline of the instrument panel at all, or almost at all in the plan view so that the airbag door is widely opened.

9. A steering column device with a knee airbag device, comprising:

a steering column provided with a telescopic mechanism;

a column cover that covers a rear end portion of the steering column;

an airbag module that is provided inside the column cover, and that includes a gas generation device that is operated to generate gas, and a knee airbag that is inflated and deployed from a folded state by the gas generated by the gas generation device;

an airbag door that is provided in a surface of the column cover, and that is opened when the airbag door receives an inflation pressure of the knee airbag;

a collision prediction device that predicts that a vehicle will have a collision with a collision object; and a control device that operates the telescopic mechanism so that each of the column cover and the airbag module is moved rearward to a predetermined position, when the collision prediction device predicts that the vehicle will have the collision with the collision object, wherein when the column cover and the airbag module are moved rearward to the predetermined position, the airbag door does not substantially interfere with an outline of an instrument panel.

* * * * *